United States Patent Office 2,898,775
Patented Aug. 11, 1959

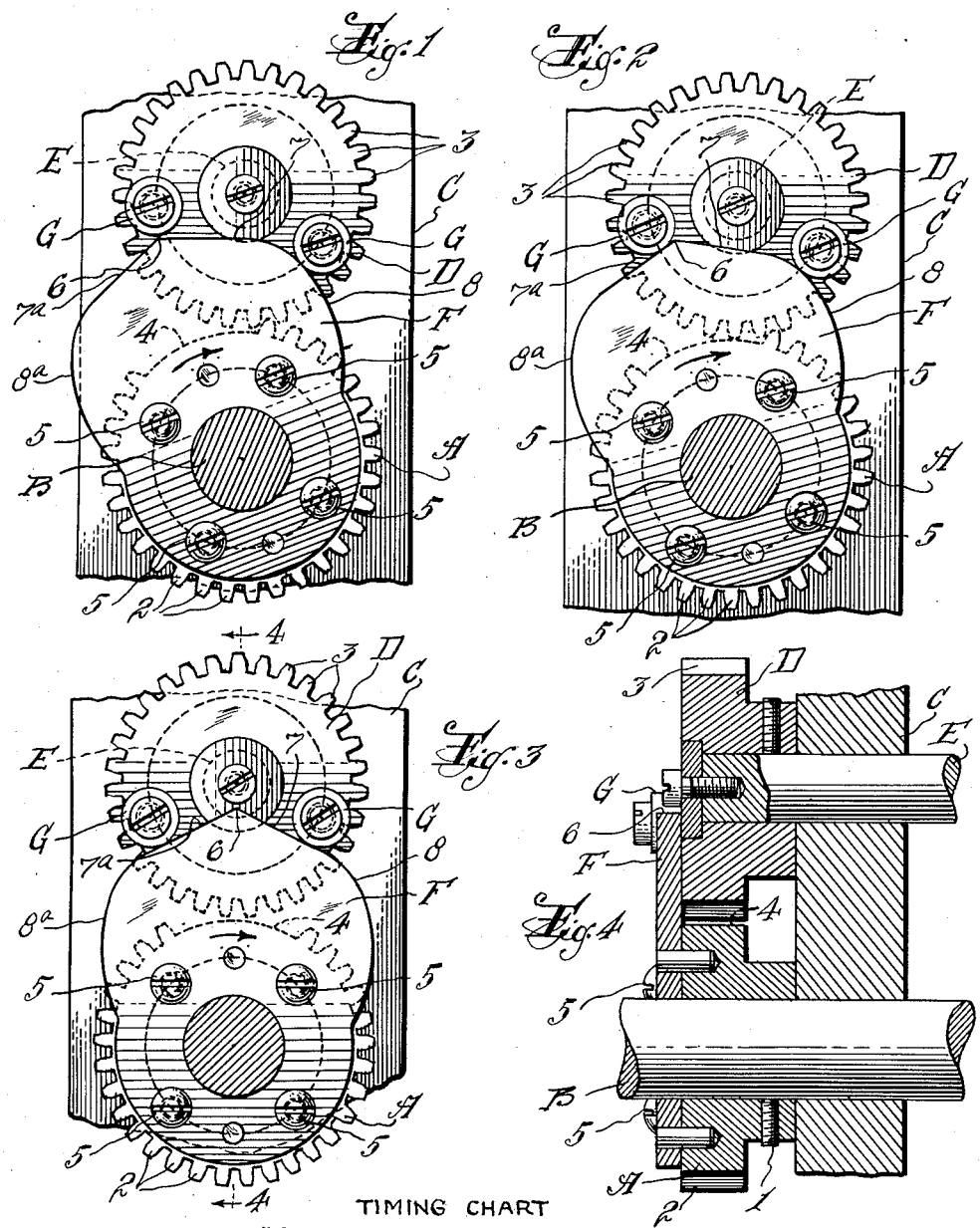

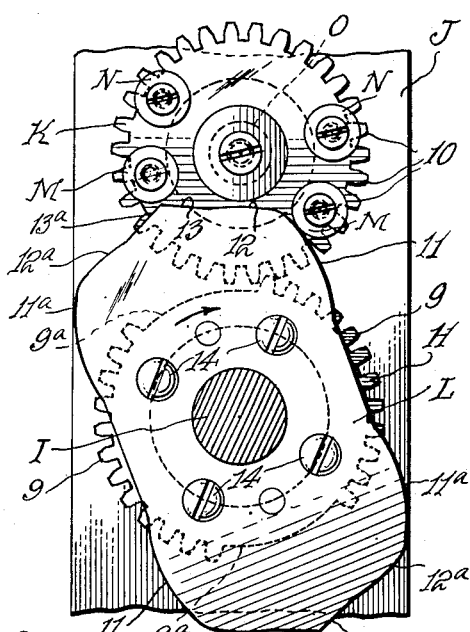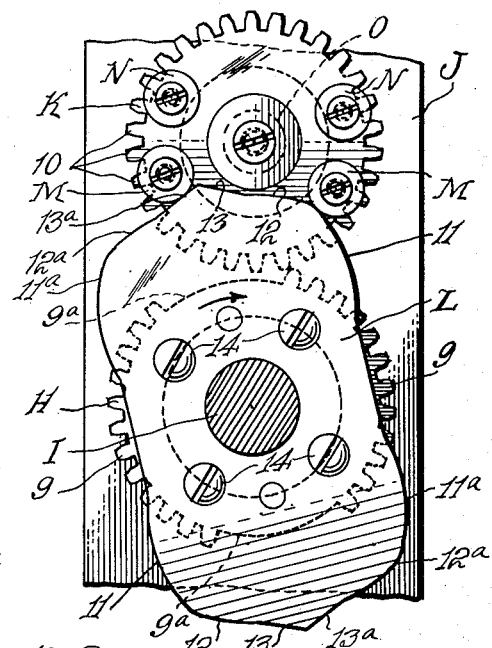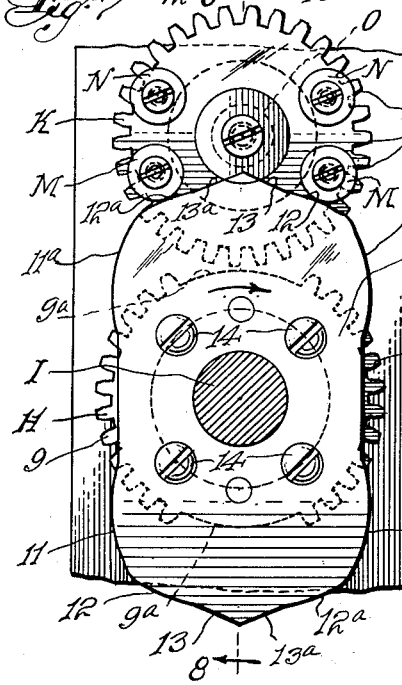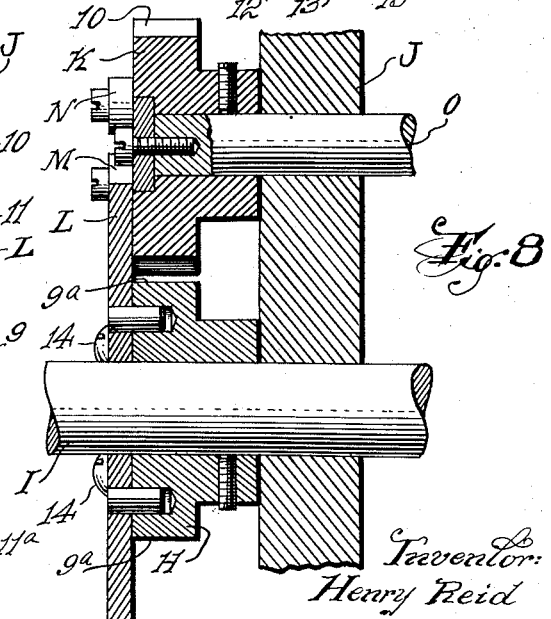

2,898,775

VARIABLE GEAR DRIVE

Henry Reid, West Orange, N.J., assignor to E.R.D. Laboratories, Inc., a corporation of New Jersey Application February 8, 1955, Serial No. 486,839

5 Claims. (Cl. 74—435)

This invention relates in general to a variable gear drive to provide deaccelerated intermittent motions with or without a dwell to permit disengagement of a clutch under load, or to provide momentary time and additional mechanical advantage at the end of a power press stroke, for example during an extrusion operation, and for other purposes that will hereinafter appear.

One object of the invention is to provide such a variable gear drive which shall include a novel and improved construction and combination of spur gears, cams and cam follower rollers, whereby various ratios between the driving and driven members shall be possible and the number of deaccelerations and stops or interruptions in the rotation of the momentary driven member also can be varied.

Another object is to provide such a variable gear drive which shall include two intermeshing spur gears, one of which can be connected to a source of motive power so as to act as the driving member for the other gear which constitutes the driven member of the variable gear drive and can be connected to any mechanism to be operated, a cam positively connetced to and movable with the driving element and follower rollers on the driven element cooperating with said cam, whereby the driven element shall be driven throughout the major portion of each revolution by the intermeshing teeth of the two gears and shall be actuated with a deaccelerated motion by said cam and follower rollers during the remaining portion of each revolution, with or without a stop or dwell.

Other objetcs, advantages and results of the invention will be brought out by the following description in conjunction with the accompanying drawings in which Figure 1 is a front elevational view of a variable gear drive constructed in accordance with the invention and showing the relative positions of the driving member and driven member at one point in the revolution thereof;

Figure 2 is a similar view showing the driving member and driven member during the next succeeding portion of the revolution thereof;

Figure 3 is a like view showing the driving element and driven element during the portion of the revolution thereof next following that shown in Figure 2;

Figure 4 is a vertical longitudinal sectional view through the variable gear drive, taken approximately on the plane of the line 4—4 of Figure 3;

Figure 4a is a timing chart for the variable gear drive of Figures 1-4 inclusive;

Figure 5 is a front elevational view of another form of the variable gear drive constructed in accordance with the invention and showing the relative positions of the driving member and the driven member at one point in a revolution thereof;

Figure 6 is a similar view showing the driving element and driven element in another succeeding point in the revolution thereof;

Figure 7 is a like view showing the driving element and driven element at a point in the revolution thereof next following that shown in Figure 6; and Figure 8 is a transverse vertical sectional view approximately on the plane of the line 8—8 of Figure 7.

Specifically describing the embodiment of the invention shown in Figures 1-4 inclusive, this variable gear drive effects one deacceleration and an instantaneous stop of the driven member during each revolution of the driving and driven members. As shown, the driving member comprises a spur gear A that is mounted on and to rotate with a shaft B which is intended to be connected to any suitable source of motive power, the shaft being journaled in a suitable framework that is schematical and partially illustrated and designated C. Preferably the gear A is rotatably adjustable on the shaft by means of a set screw 1. The gear A has a series of teeth 2 which mesh with the teeth 3 of the driven gear D which is mounted on and to rotate with a shaft E also journaled in the frame C and intended to be connected to the mechanism to be driven or controlled.

As shown, the driving gear A is formed with a series of twenty-eight actual teeth and a space 4 equivalent to five other teeth so that the driving gear will rotate the driven gear D, which is shown with thirty-one teeth, throughout the major portion of each revolution until the two gears are disengaged at the space 4, and when the teeth of the two gears become disengaged from each other an interruption occurs in the rotation of the driven gear by the teeth of the driving gear and the remainder of the revolution of the driven gear D is effected by a cam F rigidly connected to the driving gear A and cooperating with follower rollers G on the driven gear D. The pitch diameter of the driving gear is larger than the pitch diameter of the driven gear to compensate for operation of said cam during the period of interruption of the rotation of the driven gear by the teeth of the driving gear, thereby providing for a 1 to 1 drive ratio for each revolution. As shown, the cam F is fastened to the gear A by screws 5 and the high point 6 of the lobe of the cam is juxtaposed to the space 4 of the driving gear and disposed on a diametral line of the gear A that passes through the mid-point in the length of said space 4; and at one side of said high point the cam is formed with a series of cam surfaces 7 and 8 that merge into one another, while at the other side of said high point there is another series of cam surfaces 7a and 8a that are complemental or arranged oppositely to the respective surfaces 7 and 8. These cam surfaces are engaged by and cooperate with the follower rollers G during the rotation of the driving gear to rotate the driven gear.

In operation of the variable gear drive, assuming that the driving gear is rotating in the direction of the arrows in Figures 1-3 inclusive and that the teeth of the driving gear are about to become disengaged from the teeth of the driven gear as shown in Figure 1, the cam surface 8 will engage one of the rollers G. This cam surface 8 is shaped to initially actuate the driven gear with a velocity identical to that provided by normal engagement of the teeth of the two gears and, upon continued rotation of the driving gear, to continue rotation of the driven gear B with a deaccelerated motion until the cam surface 7 reaches said roller, whereupon there is an instantaneous or momentary dwell as shown in Figure 3, after which the cam surface 7 will engage said roller G. This cam surface is shaped to reaccelerate the rotation of the driven gear until the high point 6 of the cam pushes the driven gear into mesh with the driving gear, whereupon rotation of the driven gear will be continued by the toothed portion of the driving gear. The cam surfaces 7a and 8a will cooperate with the other roller G to prevent overthrowing or hunting of the driven roller and insure a smooth operation of the mechanism, although, it will be understood that by reversing the direction of rotation of the driving gear the cam surfaces 8a and 7a will perform the same driving functions that have been described in connection with the cam surfaces 8 and 7.

This variable gear drive is especially suitable for use with an extruding power press to provide an instantaneous dwell and additional mechanical advantage or squeeze at the end of the press stroke during an extrusion operation, and it will be seen that the gear drive has a ratio of 1:1 with one stop per revolution and with accelerated and deaccelerated motions. It will also be noted that actually there are two of the teeth of the driven gear that are idle during the engagement of the cam with the follower rollers. A timing chart for the gear drive is shown in Figure 4a.

Figures 5–8 inclusive of the drawings illustrate a form of the variable gear drive that permits two series of deaccelerations and two stops or dwells of the driven member during one complete revolution of the driving and driven members, which is especially advantageous to permit disengagement of a clutch under load. As shown, the driving gear H is mounted on a shaft I just as is the driving gear A and said shaft is journaled in a suitable frame J. This gear has two series of teeth 9, each series including twelve teeth, and there are spaces 9a between said series of teeth, the length of each space being equivalent to five teeth. The teeth of the driving gear H mesh with the teeth 10 of the driven gear K which is shown as having thirty teeth.

A double cam L is rigidly connected to the driving gear H, as by screws 14 to drive the driven gear when the series of teeth 9 of the driving gear move out of mesh with the teeth of the driven gear. As shown, this cam has two diametrically opposed end portions each of which has a set of cam surfaces identical with the cam surfaces of the other end portions, and the cam surfaces on one end portion cooperate with two follower rollers M on the driven gear, while the cam surfaces at the other end of the cam cooperate with a pair of follower rollers N on the driven gear. More specifically, each end of the cam includes cam surfaces 11 and 11a, 12 and 12a, and 13 and 13a, the latter of which meet at the high point of the corresponding lobe of the cam on a diametral line of the driving gear H that passes through the mid-points in the length of the spaces 9a. The driven gear K is mounted on a shaft O that may be connected to the clutch or other mechanism to be driven or controlled.

In operation of this variable gear drive shown in Figures 5–8 inclusive, assuming the driving gear H to be rotating in the direction indicated by the arrows and that the teeth of one series 9 of the driving gear are about to become disengaged from the teeth of the driven gear, the cam surface 11 at one end or lobe of the cam will engage the corresponding follower roller M and actuate the driven gear with a deaccelerated motion until said follower roller is engaged by the cam surface 12 which is concentric with the axis of rotation of the cam whereby a dwell or interruption in the rotation of the driven gear will be effected; and thereafter the cam surface 13 will engage said roller M to reaccelerate the driven gear and push the driven gear into mesh with the other series of teeth 9 on the driving gear. The continued rotation of the driving gear will rotate the driven gear until the teeth of the two gears are again disengaged and the other end or lobe of the cam coacts with the follower rollers N in the same manner as hereinabove described. Thus the driven gear is deaccelerated by the two cam surfaces 11 twice during each revolution and the driving gear is momentarily stopped by the two cam surfaces 12 twice during each revolution.

The cam surfaces 11a, 12a and 13a are complemental to the surfaces 11, 12 and 13 in the same manner in which the surfaces 7a and 8a are complemental to the surfaces 7 and 8, to prevent overthrow of the driven gear, to ensure smooth operation of the mechanism, and to actuate the driven gear upon rotation of the driving gear in the opposite direction.

It will be understood by those skilled in the art that the driven gear may be provided with the toothless portion instead of the driving gear, and that by changing the size and number of teeth of the driving and driven gears and by changing the size, shape and location of the cam surfaces, various ratios between the driving and driven members can be obtained and the number of deaccelerations and stops and lengths of dwells in the rotation of the driven member can be varied.

While the invention has been illustrated and described as embodied in certain structural details, it will be understood that this is primarily for the purpose of explaining the principles of the invention and that the invention may be embodied in other structural details and utilized for other purposes than those specifically described, all within the spirit and scope of the invention.

What I claim is:

1. A variable gear drive comprising a continuously rotatable driving gear and a rotatable driven gear, a portion of the periphery of each of said gears being toothed and engageable with the other gear, a portion of the periphery of the driving gear being toothless and disengageable from the driven gear to provide an interruption of the rotation of the driven gear by the teeth of the driving gear, a single plate cam movable with said first-mentioned or driving gear at one side thereof and having a lobe formed on its periphery with a series of cam surfaces on each of opposite sides of the high point of the lobe, and two followers on and spaced apart arcuately of one side of the other or driven gear and engageable simultaneously by said cam lobe, said cam surfaces and said follower rollers being related to said toothless portion of the driving gear to cooperate with each other, the cam surfaces of one of said series being engageable one after the other with one of said follower rollers and shaped to drivingly rotate, momentarily interrupt rotation, and resume rotation of said driven gear in one direction, respectively, the cam surfaces of the other series being complemental and arranged oppositely to the cam surfaces of the first-mentioned series and shaped and engageable one after the other with the other follower roller to prevent overthrowing or hunting of the driven gear, the pitch diameter of the driving gear being larger than the pitch diameter of the driven gear to compensate for operation of said cam during the period of interruption of the rotation of the driven gear by the teeth of the driving gear, thereby providing for a 1 to 1 drive ratio for each revolution.

2. A variable gear drive as defined in claim 1 wherein said cam surfaces extend in a direction circumferential of said driving gear with adjacent surfaces merging into one another.

3. A variable gear drive as defined in claim 2 wherein one cam surface of the first mentioned series of cam surfaces is shaped to deaccelerate rotation of said driven gear and the next cam surface is shaped to momentarily stop the driven gear and the next successive cam surface is shaped to reaccelerate the driven gear to cause reengagement thereof with the toothed portion of said driving gear.

4. A variable gear drive as defined in claim 1 wherein said periphery of the driving gear has two toothed portions and two diametrically opposite toothless portions between said toothed portions, said driven gear has two series of follower rollers and said cam has two diametrically opposite sets of cam surfaces, each set including two complemental series of cam surfaces engageable with the follower rollers of one of said two series of follower rollers.

5. A variable gear drive as defined in claim 4 wherein the cam surfaces of one series of cam surfaces of each set are shaped to cause successively deacceleration, dwell and reacceleration of the driven gear while the other series of cam surfaces of each set prevent overthrowing or hunting of said driven gear.

References Cited in the file of this patent

UNITED STATES PATENTS

| 2,192,916 | Kaddeland et al. | Mar. 12, 1940 |
| 2,464,959 | Andren | Mar. 22, 1949 |

FOREIGN PATENTS

| 82,598 | Germany | Feb. 8, 1893 |